United States Patent [19]

Kanzler et al.

[11] Patent Number: 4,811,174

[45] Date of Patent: Mar. 7, 1989

[54] VEHICLE LIGHTING DEVICE

[75] Inventors: Josef Kanzler, Emmersdorf; Alois Noisser, Biedermannsdorf; Gerald Bachtrod, Persenbeug-Gottsdorf; Ernst Gugerell, Oberndorf, all of Austria

[73] Assignee: Karl Zizala Metallwarenfabrik, Lower Austria, Austria

[21] Appl. No.: 936,805

[22] Filed: Dec. 2, 1986

[30] Foreign Application Priority Data

Dec. 4, 1985 [AT] Austria ................................ 3524/85

[51] Int. Cl.[4] ................................ B60Q 1/00

[52] U.S. Cl. ................................ 362/61; 362/297; 362/299; 362/308; 362/328; 362/335; 362/347

[58] Field of Search .................... 362/61, 80, 255, 257, 362/277, 296, 297, 298, 299, 303, 305, 328, 308, 317, 319, 326, 327, 332, 334, 335, 336, 338, 347, 348, 350, 346

[56] References Cited

U.S. PATENT DOCUMENTS

| | | | |
|---|---|---|---|
| 1,422,307 | 7/1922 | Salto | 362/308 |
| 1,610,124 | 12/1926 | Godley | 362/350 |
| 2,192,886 | 3/1940 | Bergmans et al. | 362/308 |
| 3,354,303 | 11/1967 | Monke | 362/61 |
| 3,598,989 | 8/1971 | Biggs | 362/61 |
| 4,471,411 | 9/1984 | Graham et al. | 362/80 |
| 4,569,007 | 2/1986 | Dick | 362/296 |
| 4,628,414 | 12/1986 | Ricard | 362/61 |
| 4,677,532 | 6/1987 | Peitz et al. | 362/61 |

FOREIGN PATENT DOCUMENTS

| | | | |
|---|---|---|---|
| 297125 | 3/1917 | Fed. Rep. of Germany . | |
| 2461918 | 7/1975 | Fed. Rep. of Germany . | |
| 3037107 | 4/1981 | Fed. Rep. of Germany . | |
| 3200796 | 10/1982 | Fed. Rep. of Germany . | |
| 3241826 | 5/1983 | Fed. Rep. of Germany . | |
| 3400269 | 7/1984 | Fed. Rep. of Germany | 362/61 |
| 770599 | 9/1934 | France . | |
| 2501333 | 9/1982 | France . | |
| 0139283 | 10/1979 | Japan | 362/61 |
| 1042115 | 9/1966 | United Kingdom | 362/61 |
| 1570805 | 7/1980 | United Kingdom . | |

*Primary Examiner*—Samuel Scott
*Assistant Examiner*—Noah Kamen
*Attorney, Agent, or Firm*—Seidel, Gonda, Lavorgna & Monaco

[57] ABSTRACT

The invention is directed to a vehicle headlight including a projection lens secured by a covering disk. No diaphragm is interposed between light source and the projection lens. The lens having the shape of a flat sector of a cylinder with a cut-off apex. An inner lens surface having a uniform curvature and an outer lens surface having a toroidal curvature.

22 Claims, 4 Drawing Sheets

VEHICLE LIGHTING DEVICE

SCOPE OF THE INVENTION

The invention is related to a vehicle lighting device, e.g. a headlight, having a ray guiding system comprising a unique projection lens which is arranged independently of a light source and which collects substantially all of the light emanating from the light source. The lighting device optionally includes a covering disk on the side of the projection lens opposite the light source (i.e. in front of the projection lens) and a reflector which is on the same side of the projection lens as the light source (i.e. behind the projection lens). No diaphragm is interposed between light source and the projection lens.

BACKGROUND OF THE INVENTION

A motorist's area of vision is very wide and comparatively low. Within this area, only a certain part can be lighted, otherwise oncoming traffic would be blinded or dazzled. Conventional headlight systems in which the light source consists of two optical focusing systems, namely a parabolic reflector (homofocal reflector) and a covering disk, are suitable for this purpose, however they have certain limitations. The corrugations of the covering disk (i.e. its division into groups of individual lenses) are the principal means of obtaining the desired distribution of light, however a square reflector may be used also. The covering disk is often positioned askewed in relation to the optical axis of the headlight for reasons of automobile construction. Another obstacle to appropriate headlight design arises from the reduction in size of the light emitting surface caused by style and aerodynamic considerations.

In order to obtain appropriate lighting densities in spite of these considerations, the so-called PE (polyellipsoid) and DE (three-dimensional ellipsoid) systems have been proposed. These systems are analogous to a slide projector in which the object (slide) is projected via a first collecting lens. The PE and DE systems also include a second collecting lens disposed behind the light source and the covering disk. In contrast to the slide projector, the PE and DE systems must assure a specific light distribution, that is the light/dark borderline is an essential headlight design consideration. So, the systems are provided with a special ellipsoid reflector and a diaphragm (shading blind) disposed in the area of the second focal point of the ellipsoid which creates the desired light/dark borderline.

Up to now, however, the PE and DE systems have proven unreliable in practice despite their optical advantages. The unreliability of the systems is attributed to overheating and adjustment problems. The curved object blind or "Petzval Cup" must be adjusted with the utmost precision. Moreover, this blind blocks a large amount of light energy, which is lost for illumination by conversion to thermal energy. The thermal energy causes deformation and deadjustment of the blind and overheating of the headlight. Further problems are caused by the fact that the edge of the blind, due to its position within the range of the second focal point of the ellipsoid reflector, generates a strong color seam at the light/dark borderline.

DE-OS No. 2461918 discloses a conventional headlight system with a reflector, a projection lens and a diaphragm disposed in between the described projection lenses. FIG. 5 shows an embodiment without a diaphragm in which a light/dark borderline is formed by a section of an elliptical concentrating reflector whose edge extends parallel to the incandescent filament and not by providing a reflector which is symmetrical to the light source. However, the basic requirement of the device according to claim 1 of the patent is that the surface of the exit pupil must not exceed two square centimeters in any direction. The embodiment of FIG. 5 does not comply with this requirement because direct light enters the diffusion lens from the horizontal lamp. For the embodiment of FIG. 5 to meet this requirement, a diaphragm must be provided as illustrated in each of the other drawings. Therefore, FIG. 5 must be considered to be incomplete because the disclosure must always be considered in its entirety.

DE-OS No. 3241826 discloses a PE system including an elliptical reflector having two focal points ($F_1$, $F_2$) a collecting lens, and a refractive diaphragm disposed at the second focal point $F_2$. The focal point of the collecting lens coincides with $F_2$. According to this publication, the object is to determine critical zones on the elliptical reflector and to render those zones nonreflecting or less reflecting by surface treatment or changing the zone's shape.

FR-A-2501333 discloses an optical focusing system entirely different from the instant vehicle lighting system. In the disclosed optical focusing system, the covering disk is optional. The projection lens generates the image pattern directed to the reflector. According to the reference, the projection lens, a purely diffusing lens, is followed by a diaphragm and deviation mirrors directing light against the reflector from where it is reflected toward the covering disk. Accordingly, a section-wise different curvature of the projection lens in respect to the image pattern generated by the headlight is not provided because the projection lens of the device does not project the light outside of the headlight.

GB-PS No. 1570805 discloses a headlight with a horizontally split concave reflector which allows light to project out the sides of the headlight at an angle to the main forward light ray. A bi-convex lens section covers a zone proximal the optical axis of the incandescent bulbs used in this headlight. The lens section receives only part of the emitted light. Moreover, the lens section has two identical curved convex zones. The covering disk may have a lens-like construction, but only covers the zone proximal the optical axis.

DE-OS No. 3200796 discloses dimmer lights comprising a parabolic reflector, a lamp and a dimming cap placed between the lamp and the reflector. The dimming cap includes a concave face oriented toward the light source and has adjacent areas of different curvatures.

SUMMARY OF THE INVENTION

It was unexpectedly discovered that when using a projection lens, as disclosed hereinafter, the necessity of an objective diaphragm is eliminated and the problems associated with it are eliminated, as well.

Importantly, the vehicle lighting device according to the invention is characterized by a projection lens having a section-wise different surface curvatures that does not require the interposition of a diaphragm between the light source and projection lens and that is adjustable in relation to the light source. The desired light distribution is achieved by the projection lens' section-wise different surface curvatures. In other words, the projection lens is corrected with respect to the desired image pattern, i.e. the shape of the lighted area obtained and its brightness distribution. When using a reflector, the projection lens is conveniently adjusted to the incident of light so that an adequate lens can be obtained by a casting process.

The term "section-wise different surface curvatures" means that at least one of the individual surfaces making up the projection lens is provided with a plurality of different curvatures.

In achieving the desired image pattern it is advantageous to provide the projection lens with plane areas for beam forming by total reflection.

Conveniently, peripheral areas of the projection lens are opaquely masked for limiting light exit. This can conveniently be effected by means of the projection lens support or by the light mask itself, i.e. the outer light rim.

A covering disk is not absolutely necessary, so that the projection lens may form the front face of the headlight. However, in some cases a covering disk may be advantageous.

The projection lens is preferably adjustable with respect to the light source. Alignment precision which is indispensable in those optical systems having a diaphragm is not required with the present system. In FIG. 1, a preferred adjustment system is shown, however, a pivoting, rotating or shifting adjustment system can be used as well.

In the instant lighting device the full amount of light is avialable for lighting, except that light masked at the peripheral areas. Therefore, a reflector is not absolutely necessary, but is advantageous. A particularly suitable reflector includes at least two, mutually independent curved sections arranged symmetrically with respect to the light source. These sections are curved away from the light source. The reflector may be formed with these sections. These curved sections are proximal the light source in an area of highest reflector curvature. These sections preferably have spherical surface profiles, preferably with identical radii. The sections are joined to one another to form a joint edge which is intersected by the optical axis of the headlight.

In the instant vehicle light, light sources are preferably oriented in such a manner that the incandescent filament is at essentially a right angle with respect to the optical axis of the headlight, and at least parallel to the light exit limiting edge of the headlight. The incandescent filament thus conveniently extends parallel to the roadway and at a right angle to the optical axis of the lighting device. For example, a first light bulb ($H_1$) having an axial helix is inserted from a side of the headlight or a second light bulb ($H_3$) having a transverse helix is inserted from the top or bottom of the headlight.

A square light having flattened reflectors at the top and bottom of the curved reflector is of particular advantage in the instant invention.

Additionally, the reflector may be provided with steps (reflecting surfaces) outside the area of the curved section.

In another embodiment of the instant invention, a double light is provided with independent light sources, preferably the light sources are inserted from the opposing sides of the headlight. This embodiment is also related to superimposed lights in which one light bulb is inserted from the top and the other from the bottom. It is also possible to insert the light bulbs from behind or laterally.

It is also possible to provide one shielding screen between the light sources of the double light to prevent reflected light from appearing on the light source bulb and/or socket to the projection lens.

The concerted beam focusing makes it possible to use the instant vehicle light for all applications in motor vehicle external lighting, in particular for dimmers, fog lights or far-reaching headlights, but also for positioning or break lights or rear lights.

DESCRIPTION OF THE DRAWINGS

The invention is explained with regard to the examples set forth in the accompanying drawings wherein.

DESCRIPTION OF THE INVENTION

Figure 1:
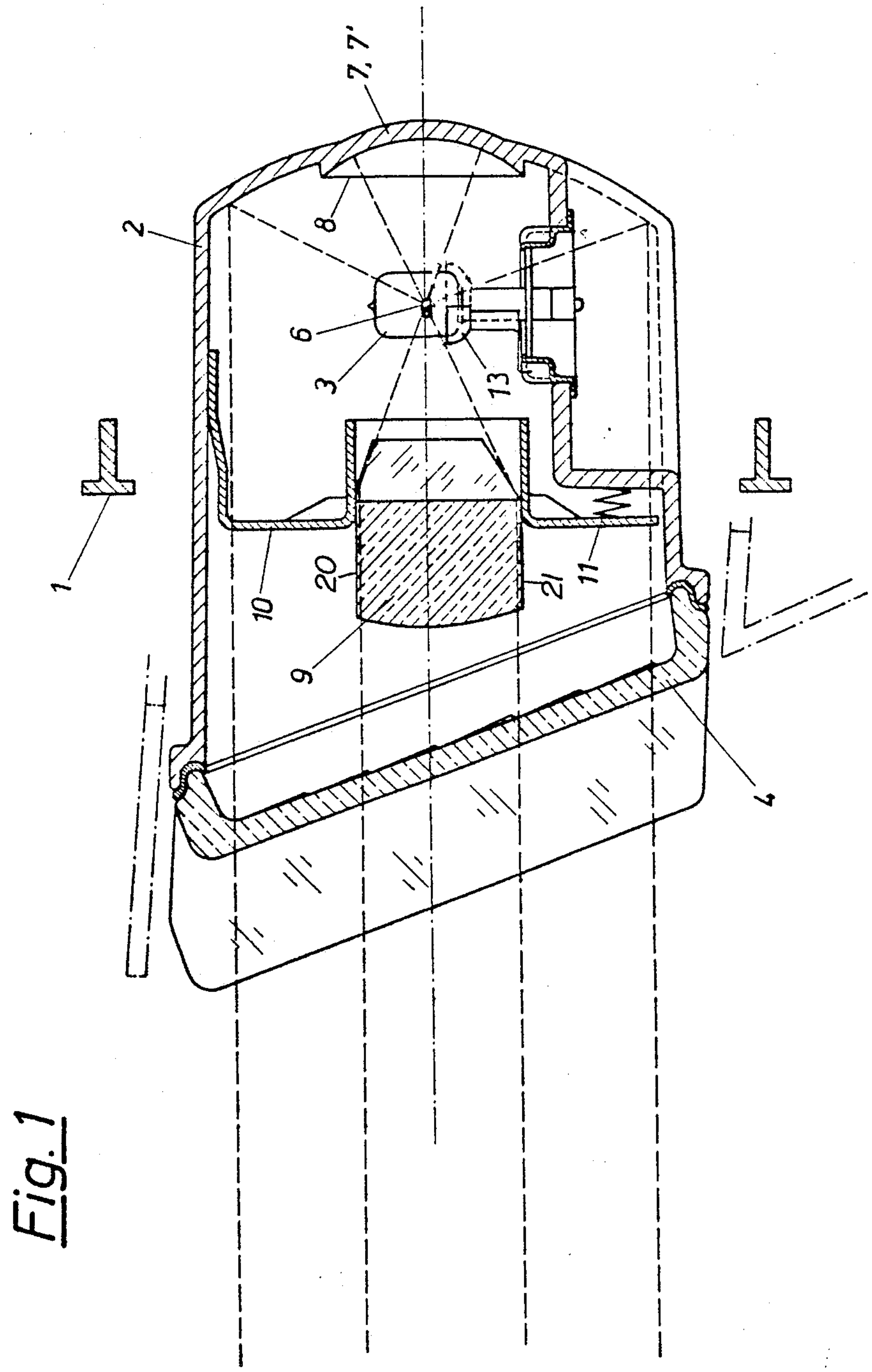
FIG. 1 shows a vertical sectional view.

The figures illustrate a square headlamp having a support 1, a reflector 2, an incandescent bulb 3 and a covering disk 4. Covering disk 4 is askew to the optical axis 5 of the headlight, i.e. it is at an angle to the vertical as well as to the horizontal plane of symmetry of the reflector.

The incandescent bulb 3 is inserted from the bottom, so that its helix 6 extends horizontally and in the horizontal projection parallel to the upper and lower light exit limiting edges of the headlight.

The reflector 2 is a parabolic reflector provided in the zone of its highest curvature with two sections 7, 7' arranged symmetrically in relation to the optical axis 5 and curved away from the incandescent bulb 3. The joint edge 8 of the sections 7, 7' intersects the optical axis 5. The curved sections 7, 7' having a spherical surface profile with identical radii.

A projection lens, mounted in lens support 10, is located between the incandescent bulb 3 and covering disk 4. The projection lens 9 is a flat, wedged-shaped lens having a cut off apex and is curved away from the incandescent bulb on the light incidence side as well as one the light exit side. It thus fulfills the function of a combined collecting and refractive lens. The light incidence side curvature is a cylindrical surface, the light exit side curvature is a corrected toroid surface. In FIG. 1, it can be seen that the lower flat area 21 of projection lens 9 is shorter than its upper flat area 20. The flat areas 20, 21, 22, 23 of the projection lens 9 serve as, among other things, a beam former by total reflection.

The lens support 10 is adjustable in relation to the incandescent bulb 3. It is shown that the lens support is firmly attached to the reflector body 2 at the top and that a screw adjustment with a pressure spring 11 is provided at the bottom.

Projection lens 9 is arranged in doubly asymmetrically relation to the optical axis 5. A single asymmetric or symmetrical arrangement is also possible.

Figure 3:
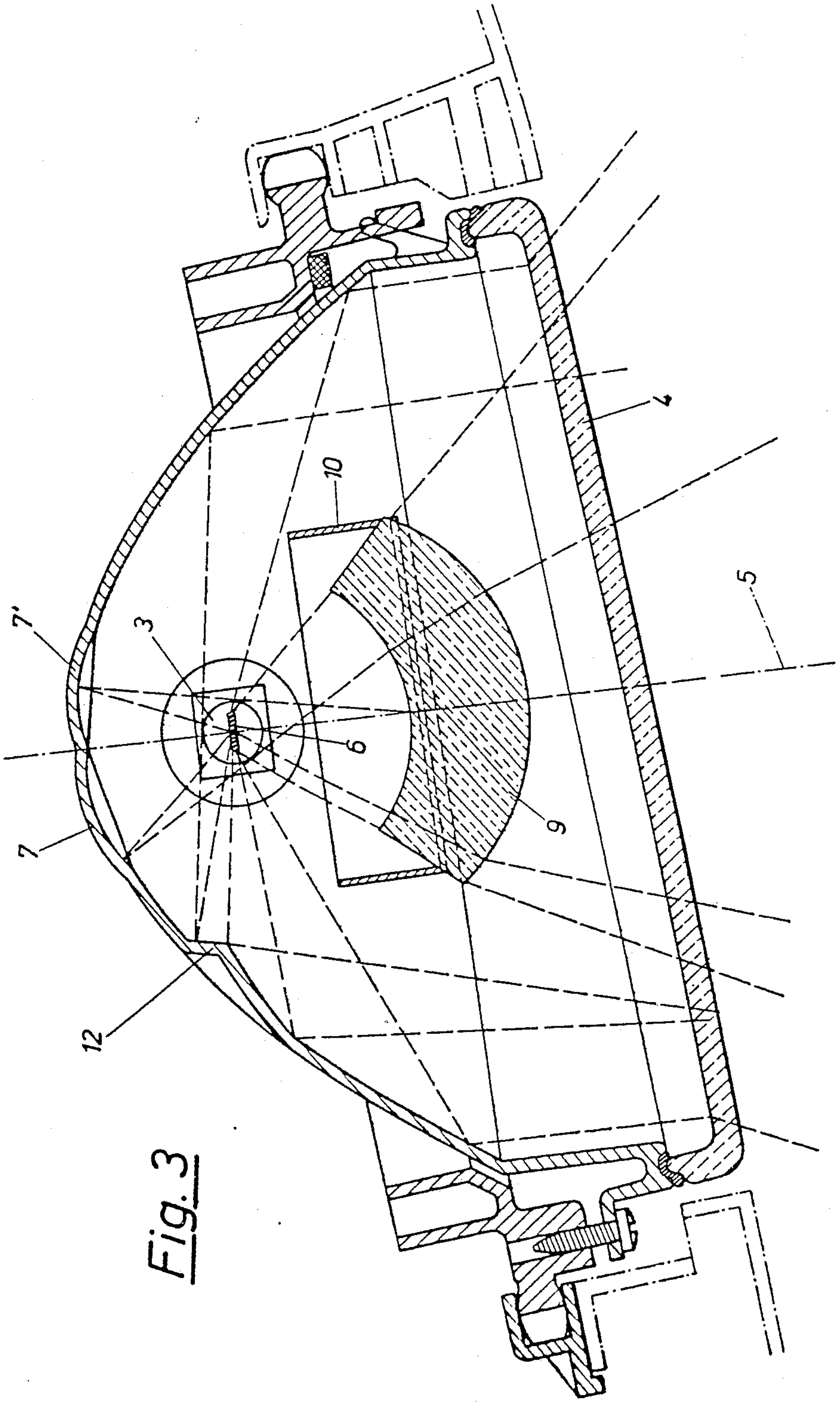
FIG. 3 shows a horizontal sectional view of an alternate embodiment of the headlight illustrated in FIGS. 1 and 2.
Figure 4:
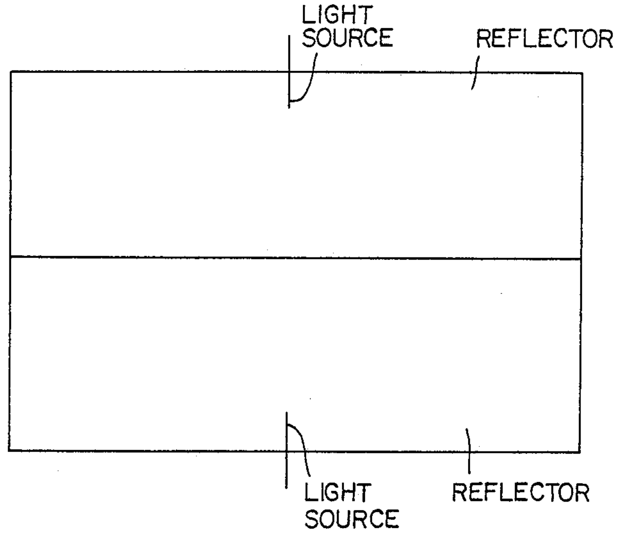
FIG. 4 shows a double light embodiment.

In FIG. 3, the reflector 2 is provided with an additional step (reflecting surface) 12 outside of the curved sections 7, 7'. Step 12 may be disposed on either side of the incandescent bulb and focuses the peripheral rays to the preferred areas.

The figures illustrate various paths of light rays. Optionally, some surfaces of the projection lens 9 may be mirrored, particularly the upper and lower flat surfaces 20, 21 may be mirrored. Support 10 may also be mirrored in those areas where focused light from curved section 7, 7′ are incident.

FIG. 1 shows that the covering disk 4, if used, may have appropriate corrugations.

Figure 2:
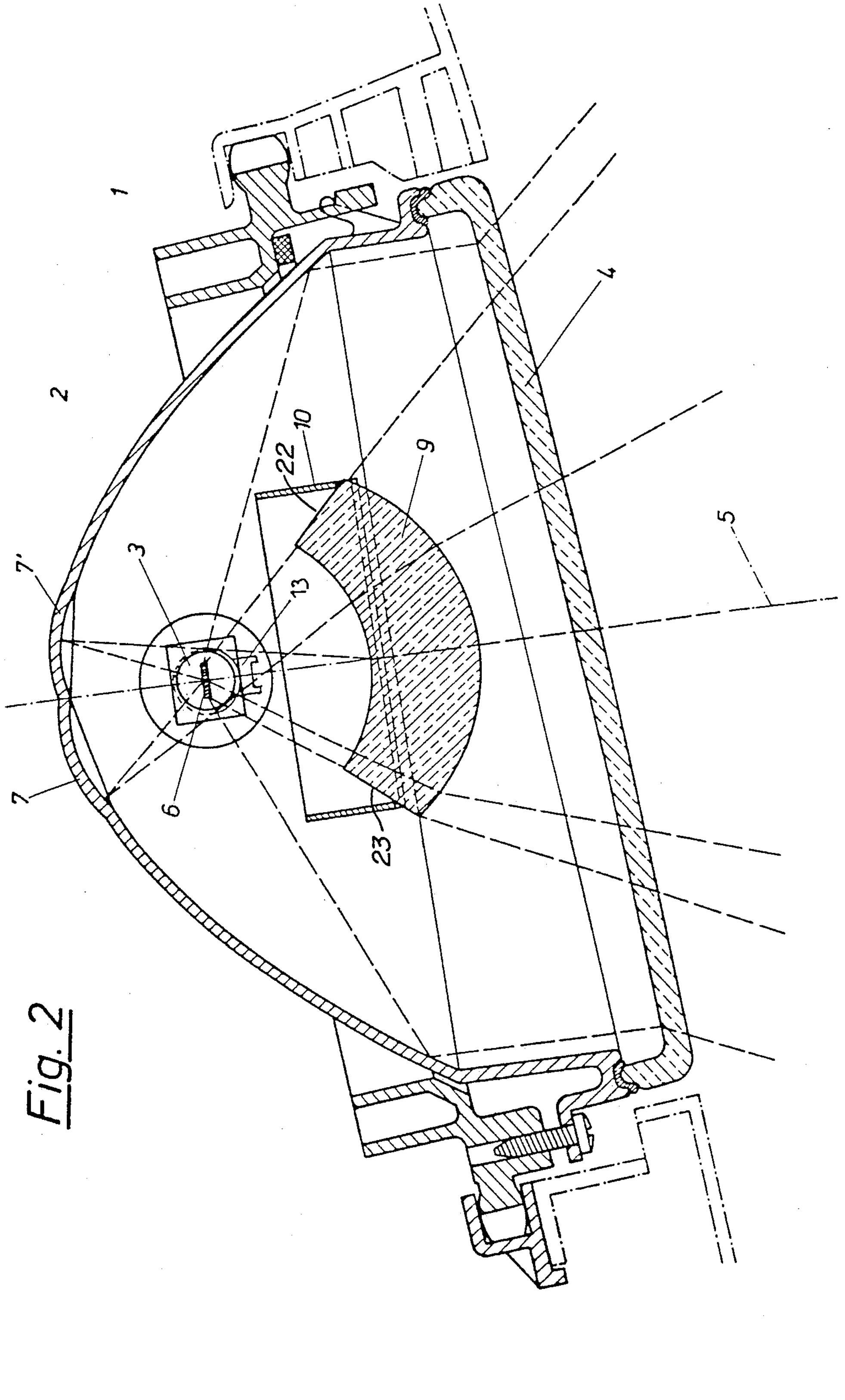
FIG. 2 shows a horizontal sectional view of a headlight.

The embodiment shown in FIGS. 1 and 2 is provided with a screen shield 13 surrounding the lamp shaft at the lower part of the bulb in an approximate semicircle. The screen shield may completely encircle the lamp particularly in the bulb area. The screen shield can also be used to prevent the lamp (for instance through the bulb socket of the $H_3$ lamp shown) and/or on the lamp socket from acting as a reflector and thereby reflecting stray light onto the reflection lens.

The upper and lower surfaces of the projection lens need not be parallel to each other. They may form an angle between them so that the thickness (height) of the projection lens increases in the direction of the emitted light, i.e. exit surface opposite the light source. Preferably the upper face is horizontal in this case. Furthermore, the light receiving face of the projection lens adjacent to the light source may not have a cylindrical configuration, but can preferably be a spherical configuration. Other curvatures are possible, for example, a plane surface may be used but it is not preferred.

The zones of maximum curvature of the light exit face of the projection lens are preferably position at the lens' central region, referring to the height of the lens. The exact configuration of the surface will be determined as a function of the intended shape of the light pattern and its light energy distribution, the brightness pattern.

According to the invention, the desired light distribution and radiant intensity per unit area can be obtained without the provision of a heat-sensitive light/dark borderline shading blinds (diaphragm). Moreover, the production of a reflector according to the invention is much simpler than that of the PE or DE reflectors. The adjustment of the optical system is also much less complicated and less susceptible to failure as compared to the PE and DE systems.

Finally, the headlight system according to the invention does not require the provision of a bi-focal reflector, if a reflector is provided at all. The overall length of a headlight according to the invention is much less than comparable PE and DE headlights.

According to the invention, the desired light distribution and radiant intensity per unit area can thus be obtained without the provision of heat-sensitive light/dark shading blinds; moreover, the production of a reflector according to the invention is much simpler than that of a PE or DE reflector. The adjustment of the optical system is also much less complicated and less susceptible to failure as compared to the PE and DE systems.

Finally, the headlight system according to the invention does not require the provision of a bifocal reflector if a reflector is provided at all; the overall length of a headlight according to the invention is much reduced in comparison to that of PE and DE headlights.

We claim:

1. A rectangular lighting device for use in combination with a vehicle comprising:

a light source;

a projection lens having an approximate shape of a flat sector of a cylinder with a cut-off apex, a first surface of said lens facing said light source having a uniform curvature and a second surface of said lens located on said lens opposite said first surface being part of a toroid's surface, surfaces of said lens above and below said first and second surfaces being plane;

an optical axis being defined between said light source and said lens;

a reflector located proximal said light source and on a side of said light source opposite said lens and having a curved central section and flat sections located above and below said optical axis, said curved central section positioned proximal said light source, said reflector further including two subsections forming a joint edge therebetween, said optical axis intersecting said edge such that said subsections are symmetrically disposed about said axis, each said subsection being curved away from said light source and having a curvature greater than said central section; and a front lens located adjacent said projection lens opposite said light source.

2. The lighting device according to claim 1 wherein each said subsection has a spherical curvature.

3. The lighting device according to claim 1 wherein the curvature of said subsections are identical.

4. The lighting device according to claim 1 wherein said plane surfaces of said lens reflect substantially all light incident thereupon.

5. The lighting device according to claim 1 wherein said plane surfaces of said lens are parallel to each other.

6. The lighting device according to claim 5 wherein said plane surfaces of said lens are horizontal.

7. The lighting device according to claim 1 wherein said first surface of said projection lens has a cylindrical curvature.

8. The lighting device according to claim 1 wherein said front lens includes an upper rim and a lower rim, a distance between said upper rim and said light source being greater than a distance between said lower rim and said light source.

9. The lighting device according to claim 1 wherein said front lens is askewed in relation to said optical axis.

10. A lighting device for use in combination with a vehicle comprising a ray guiding system having a projection lens mounted independently of a light source without the interposition of a diaphragm between said light source and said projection lens, said projection lens having an approximate shape of a flat sector of a cylinder with a cut-off apex, a first surface of said projection lens located on a side of said projection lens opposite said light source having section-wise different surface curvatures.

11. The lighting device according to claim 10 wherein said projection lens further comprises an upper surface and a lower surface, said upper and lower surfaces being parallel to one another and horizontal.

12. The lighting device according to claim 11 wherein said projection lens further comprises two lateral surfaces, an upper surface and a lower surface that reflect a substantial portion of the light incident upon said surfaces.

13. The lighting device according to claim 11 wherein said projection lens further comprises a second surface facing said light source and having a cylindrical curvature.

14. The lighting device according to claim 11 wherein said first surface being part of a toroid's surface.

15. The lighting device according to claim 11 wherein said first surface further comprises a central portion and two lateral portions, said central portion's curvature being greater than said lateral portion's curvature.

16. A lighting device for use on a vehicle comprising a ray guiding system having a projection lens being mounted independently of a light source without a diaphragm being interposed between said lens and said light source, said projection lens including a first surface having section-wise different surface curvatures, and upper and lower horizontal planar surfaces for reflecting light from said surfaces into a beam.

17. The lighting device according to claim 16 wherein said projection lens further comprises a second curved surface located on said lens opposite said first surface.

18. The lighting device according to claim 16 wherein said planar surfaces are opaquely masked.

19. The lighting device according to claim 16 wherein said ray guiding system further comprises a lens support which holds said projection lens, said lens support opaquely masking said planar surfaces.

20. The lighting device according to claim 16 wherein said projection lens is adjustable with respect to said light source.

21. The lighting device according to claim 16 wherein said ray guiding system further comprises a covering disk located on a side of said projection lens opposite said light source.

22. The lighting device according to claim 16 wherein said ray guiding system further comprises a reflector located on a side of said light source opposite said projection lens.

* * * * *